US011946288B2

(12) United States Patent
Huang

(10) Patent No.: US 11,946,288 B2
(45) Date of Patent: Apr. 2, 2024

(54) LOCK

(71) Applicant: TAIWAN FU HSING INDUSTRIAL CO., LTD., Kaohsiung (TW)

(72) Inventor: Chao-Ming Huang, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 689 days.

(21) Appl. No.: 17/110,319

(22) Filed: Dec. 3, 2020

(65) Prior Publication Data

US 2022/0064996 A1 Mar. 3, 2022

(30) Foreign Application Priority Data

Aug. 27, 2020 (TW) ................................ 109211166

(51) Int. Cl.

*E05B 63/00* (2006.01)
*E05B 27/00* (2006.01)
*E05B 55/00* (2006.01)
*E05B 63/16* (2006.01)

(52) U.S. Cl.

CPC .......... *E05B 63/0069* (2013.01); *E05B 27/00* (2013.01); *E05B 55/00* (2013.01); *E05B 63/16* (2013.01)

(58) Field of Classification Search

CPC ...... E05B 63/0069; E05B 55/00; E05B 63/16; E05B 27/00; E05B 1/00; E05B 3/003; E05B 13/002; E05B 13/004; E05B 13/10; E05B 13/101; E05B 13/005; E05B 17/0054; E05B 17/0058; E05B 17/044; E05B 17/045; E05B 17/046; E05B 55/06; E05B 63/04; Y10T 292/82; Y10T 292/85

USPC ........................................................... 70/141

See application file for complete search history.

(56) References Cited

U.S. PATENT DOCUMENTS 1,688,240 A * 10/1928 Keigwin ............... E05B 13/004 292/DIG. 52
4,920,773 A * 5/1990 Surko, Jr. ............... E05B 55/06 70/472
5,460,417 A 10/1995 Zuckerman
(Continued)

FOREIGN PATENT DOCUMENTS

CN 1592812 A * 3/2005 ............. E05B 53/00
CN 201125571 Y * 10/2008 ............ E05B 3/003
(Continued)

*Primary Examiner* — Kristina R Fulton
*Assistant Examiner* — Steven A Tullia
(74) *Attorney, Agent, or Firm* — Winston Hsu

(57) ABSTRACT

A lock defining a rotating axis and for being installed on a door includes a first handle set, a second handle set, a transmission element and a latch mechanism. The first handle set is disposed on a side of the door and includes a first handle and a first tubular element. The second handle set is disposed on another side of the door and includes a second handle, a cylindrical element, a movable element and a second tubular element. The second tubular element is independent from the first tubular element. The transmission element has a first end connected to the first handle set and a second end connected to the movable element. The latch mechanism is disposed between the first handle set and the second handle set and includes a latch tongue driven by the first tubular element or the second tubular element.

17 Claims, 11 Drawing Sheets

(56) References Cited

U.S. PATENT DOCUMENTS

| | | | | | |
|---|---|---|---|---|---|
| 5,794,472 | A * | 8/1998 | Kester | E05B 55/005 70/472 |
| 5,816,086 | A * | 10/1998 | Russell, IV | E05B 55/005 292/336.3 |
| 5,868,018 | A * | 2/1999 | Kang | E05B 13/101 70/472 |
| 5,904,232 | A * | 5/1999 | Shen | E05B 13/101 192/69.62 |
| 5,934,117 | A * | 8/1999 | Shen | E05B 55/06 70/472 |
| 5,941,108 | A * | 8/1999 | Shen | E05B 55/005 292/336.3 |
| 5,992,189 | A * | 11/1999 | McCaa | E05B 55/005 292/336.3 |
| 6,041,630 | A * | 3/2000 | Shen | E05B 13/101 70/472 |
| 8,113,021 | B2 * | 2/2012 | Tsai | E05B 3/003 70/222 |
| 8,479,544 | B2 * | 7/2013 | Liu | E05B 55/005 292/336.3 |
| 8,833,120 | B2 * | 9/2014 | Collins | E05B 13/004 292/336.5 |
| 8,939,477 | B2 * | 1/2015 | Welsby | E05B 55/005 292/347 |
| 9,228,374 | B2 * | 1/2016 | Huang | E05B 55/005 |
| 9,611,672 | B2 * | 4/2017 | Murphy | E05B 15/0033 |
| 10,711,485 | B2 * | 7/2020 | Li | E05B 1/0007 |
| 11,236,526 | B2 * | 2/2022 | Shetty | E05B 55/005 |
| 11,280,109 | B2 * | 3/2022 | Balasubramaniam | E05B 13/101 |
| 11,359,407 | B2 * | 6/2022 | Kaverina | E05B 41/00 |
| 2005/0223763 | A1 * | 10/2005 | Huang | E05B 3/065 70/224 |
| 2005/0274163 | A1 * | 12/2005 | Shen | E05B 17/0062 70/422 |
| 2006/0156770 | A1 * | 7/2006 | Huang | E05B 3/065 70/224 |
| 2008/0098775 | A1 * | 5/2008 | Don | E05B 13/101 70/101 |
| 2009/0056391 | A1 | 3/2009 | Mathachan | |
| 2012/0267903 | A1 | 10/2012 | Welsby | |
| 2014/0196509 | A1 * | 7/2014 | Moon | E05B 17/2092 70/1.5 |
| 2015/0013402 | A1 | 1/2015 | Murphy | |

FOREIGN PATENT DOCUMENTS

| | | | | |
|---|---|---|---|---|
| EP | 0801193 | A1 * | 3/1997 | E05C 9/026 |
| FR | 2607859 | A1 * | 12/1986 | E05B 63/16 |
| GB | 2534682 | A * | 8/2016 | E05B 15/0033 |
| KR | 200431813 | Y1 * | 9/2006 | E05B 15/0033 |
| KR | 20090012608 | U * | 6/2008 | E05B 9/08 |
| KR | 200431813 | Y1 * | 2/2009 | E05B 15/0033 |
| KR | 20170106530 | A * | 3/2016 | E05B 9/02 |
| WO | WO-9806916 | A1 * | 2/1998 | E05B 13/101 |
| WO | WO-2007128868 | A1 * | 11/2007 | E05B 15/0033 |
| WO | WO-2015003189 | A1 * | 1/2015 | E05B 13/004 |
| WO | WO-2021119599 | A1 * | 6/2021 | E05B 1/0038 |

* cited by examiner

LOCK

BACKGROUND OF THE INVENTION

1. Field of the Invention

The present disclosure relates to a lock, and more particularly, to a lock in which a first handle and a second handle are capable of independently driving a latch tongue.

2. Description of the Prior Art

A door lock usually includes an outer handle, an inner handle and a latch mechanism and defines a rotating axis, wherein the outer handle, the inner handle and the latch mechanism are connected through a transmission shaft, such that the outer handle and the inner handle are connected and capable of moving synchronously with each other. A latch tongue of the latch mechanism can be driven by rotating the outer handle or the inner handle, so as to open or close the door. However, when the door lock is in a locked state and a user wants to go out, the user needs to rotate the rotating button of the inner handle to drive the transmission shaft to rotate, so as to unlock the door. Due to the small volume of the rotating button, the force arm provided by the rotating button is small. Accordingly, it is laborious to rotate the rotating button. Further, the user needs more time to aim at the rotating button during operation, and thus cannot unlock the door lock quickly. When an emergency, such as a fire or an earthquake, happens, a tragedy that the user cannot escape in time may happen.

For improving the drawbacks of the aforementioned door lock, a lock in which an inner handle and an outer handle can be rotated independently from each other is provided. The lock can be unlocked by rotating the inner handle. When the user wants to go out, there is no need to aim at the rotating button and thus the user can unlock the lock quickly. Further, a force arm provided by the inner handle is larger than that of the rotating button, which is favorable for saving labor. However, the lock in which the inner handle and the outer handle can be rotated independently from each other is arranged with a rotating shaft. The rotating shaft includes a middle shaft, an inner shaft, an outer shaft and a fixing sprig. The inner shaft is connected to the inner handle in a manner that the inner shaft and the inner handle are capable of moving synchronously. The outer shaft is connected to the outer handle in a manner that the outer shaft and the outer handle are capable of moving synchronously. The inner shaft is disposed on the middle shaft in a manner that the inner shaft is capable of rotating relative to the middle shaft, and the outer shaft is fixedly disposed on the middle shaft. The middle shaft includes an engaging portion, an inner axis and an out axis. The inner axis and the out axis are extended from two ends of the engaging portion, respectively. The inner axis includes an annular groove disposed on a free end thereof, and a pin hole formed closed to the engaging portion. The outer axis is formed with exterior threads closed to the engaging portion. The inner shaft has an axial hole, and a surface of an end of the inner shaft is formed with a limiting block. The outer shaft has an axial hole, and inner threads are formed on an inner wall of the axial hole of the outer shaft. When assembling the rotating shaft, a spring pin is inserted in the pin hole of the inner axis, and the end of the inner shaft formed with the limiting block is disposed around the inner axis. With the cooperation of the spring pin and the limiting block, the inner shaft is only capable of reciprocatingly rotating relative to the inner axis within 180 degrees. Afterwards, the fixing spring is disposed around the inner axis and is accommodated in the axial hole of the inner shaft, and an E-shaped gasket is disposed on the annular groove of the inner axis, such that the inner shaft and the fixing spring are limitedly disposed on the inner axis. The axial hole of the outer shaft is disposed around the outer axis, and the inner threads of the outer shaft are threaded with the exterior threads of the outer axis, such that the outer shaft and the middle shaft are connected. According to the above description, it is obvious that the rotating shaft has drawbacks of numerous components and complicated assembling process.

SUMMARY OF THE INVENTION

According to an embodiment of the present disclosure, a lock defining a rotating axis and for being installed on a door includes a first handle set, a second handle set, a transmission element and a latch mechanism. The first handle set is disposed on a side of the door. The first handle set includes a first handle and a first tubular element. The first tubular element is connected to the first handle in a manner that the first tubular element and the first handle are capable of moving synchronously. The second handle set is disposed on another side of the door. The second handle set includes a second handle, a cylindrical element, a movable element and a second tubular element. The cylindrical element is disposed in the second handle. The cylindrical element includes a guiding track. The guiding track has an unlocked end and a locked end opposite to the unlocked end. The movable element is disposed in the cylindrical element in a manner that the movable element is capable of moving along the guiding track. The second tubular element is connected to the second handle in a manner that the second tubular element and the second handle are capable of moving synchronously. The second tubular element is independent from the first tubular element. The transmission element has a first end and a second end opposite to the first end. The first end is connected to the first handle set. The second end is connected to the movable element. The latch mechanism is disposed between the first handle set and the second handle set. The latch mechanism includes a latch tongue driven by the first tubular element or the second tubular element. When the cylindrical element is operated to move along the rotating axis and towards the first handle set, the movable element is driven to move from the unlocked end to the locked end to drive the transmission element to rotate, such that the lock is switched from an unlocked state to a locked state. When the second handle is operated to rotate along a first direction, the cylindrical element is driven to rotate, and the movable element is driven to move from the locked end to the unlocked end to drive the transmission element to rotate, such that the lock is switched from the locked state to the unlocked state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
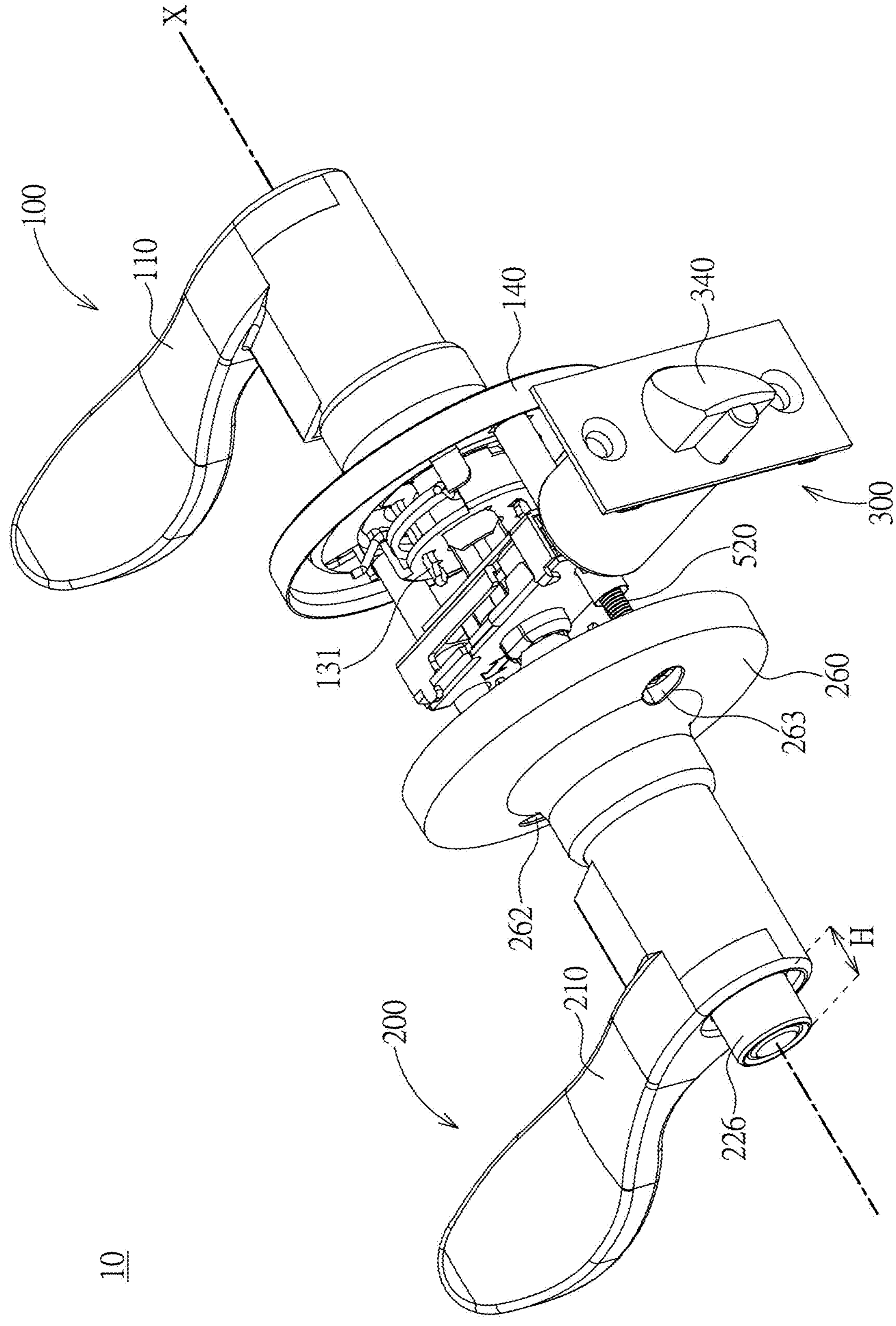
FIG. 1 is a three-dimensional diagram showing a lock according to one embodiment of the present disclosure.

In the following detailed description of the embodiments, reference is made to the accompanying drawings which form a part thereof, and in which is shown by way of illustration specific embodiments in which the disclosure may be practiced. In this regard, directional terminology, such as top, bottom, left, right, front or back, is used with reference to the orientation of the Figure (s) being described. The components of the present disclosure can be positioned in a number of different orientations. As such, the directional terminology is used for purposes of illustration and is in no way limiting. In addition, identical or similar numeral references are used for identical components or similar components in the following embodiments. Accordingly, the drawings and descriptions will be regarded as illustrative in nature and not as restrictive.

Please refer to FIGS. 1 to 6. A lock 10 defines a rotating axis X and is for being installed on a door (not shown). The lock 10 includes a first handle set 100, a transmission element 400, a first fixing element 510, a second fixing element 520, a second handle set 200 and a latch mechanism 300. The first handle set 100 is disposed on a side of the door. The second handle set 200 is disposed on another side of the door. The transmission element 400 is connected with the first handle set 100 and the second handle set 200. The latch mechanism 300 is disposed between the first handle set 100 and the second handle set 200. The first fixing element 510 and the second fixing element 520 are configured to combine the first handle set 100 and the second handle set 200, so as to fix the first handle set 100, the second handle set 200 and the latch mechanism 300 on the door.

Specifically, the first handle set 100 includes, in order from outside to inside, a first handle 110, a lock element 120, a first axial tube 130, a first cover plate 140, a first elastic element 150, a moving component 160, a first restoring element 170, a first driving element 180 and a first tubular element 190. The first handle 110 surrounds an outer end of the first axial tube 130. The first handle 110 is connected to the first axial tube 130 in a manner that the first handle 110 and the first axial tube 130 are capable of moving synchronously. For example, the first handle 110 can be connected to the first axial tube 130 through engagement, such that the first handle 110 is capable of rotating with the first axial tube 130. An inner end of the first handle 110 is inserted between the first axial tube 130 and the first cover plate 140 (shown in FIG. 5), such that the first handle 110 is connected to the first cover plate 140 in a manner that the first handle 110 is capable of rotating relative to the first cover plate 140. The first handle 110 includes a penetrating hole 111 (shown in FIG. 3).

Figure 13:
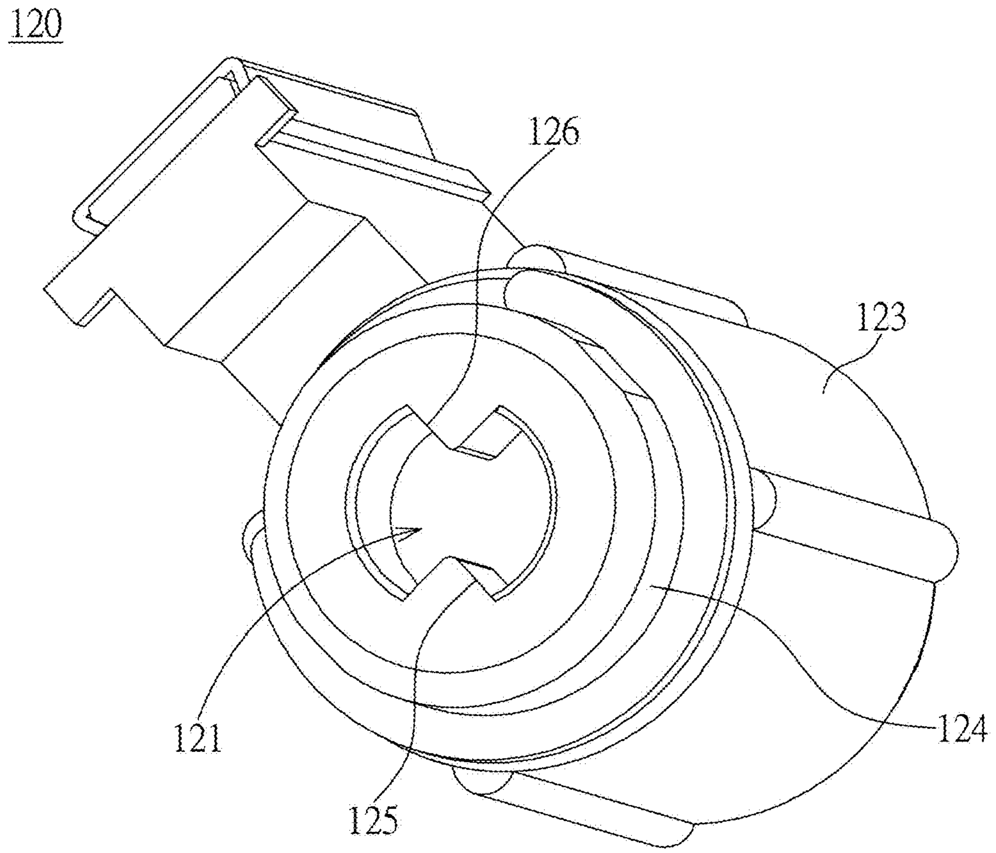
FIG. 13 is a three-dimensional diagram showing a lock element of FIG. 2.

Please also refer to FIG. 13. The lock element 120 is disposed in the first handle 110. The lock element 120 includes an outer cylinder 123 and a lock cylinder 124. An inner end of the lock cylinder 124 is disposed with an accommodating groove 121. The accommodating groove 121 includes a first abutting surface 125 and a second abutting surface 126. An outer end of the lock cylinder 124 is disposed with a keyhole 122 (shown in FIG. 3). The keyhole 122 is exposed to outside through the penetrating hole 111 of the first handle 110.

Figure 5:
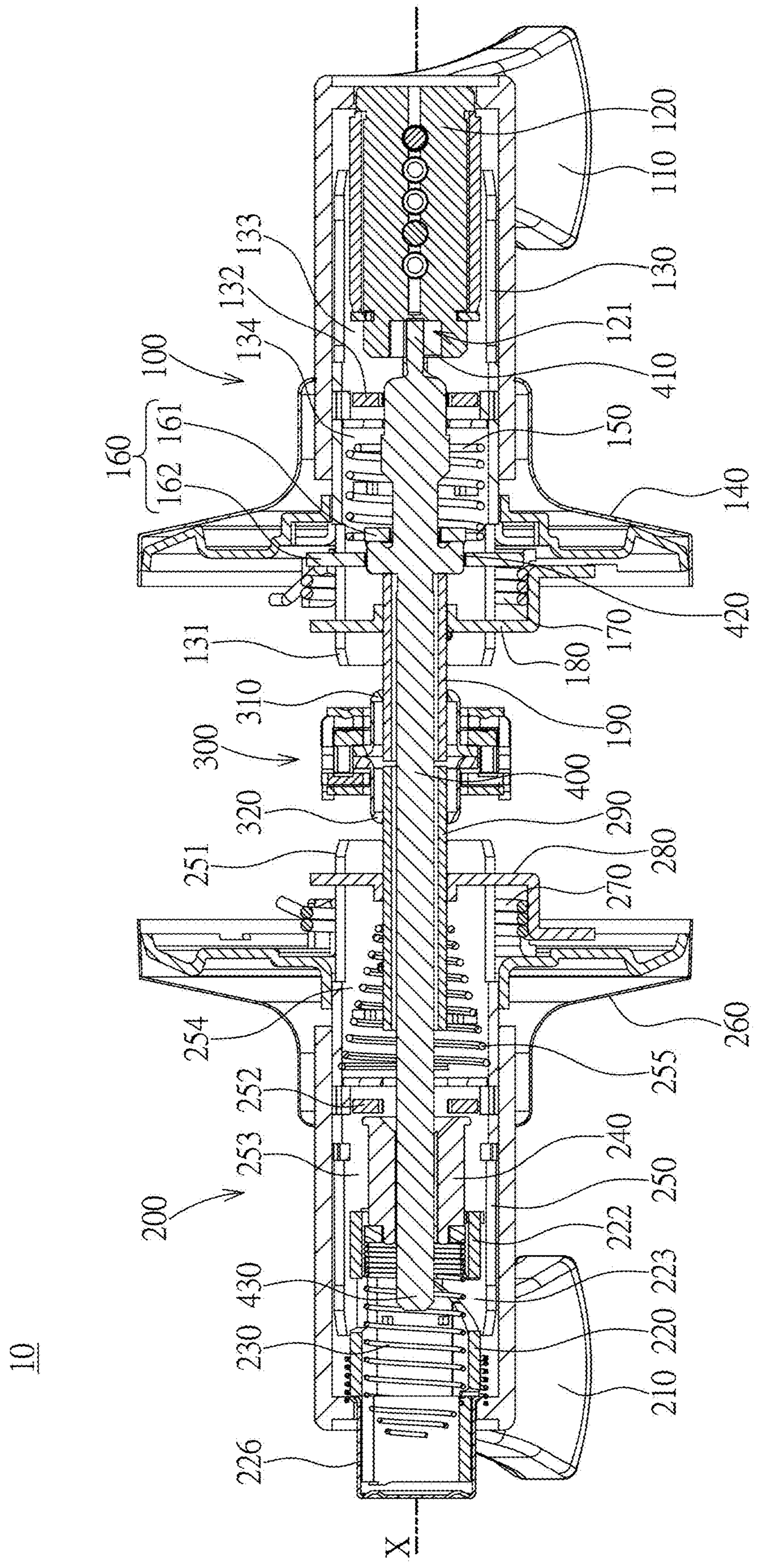
FIG. 5 is a cross-sectional view of the lock taken along line A-A in FIG. 4.
Figure 6:
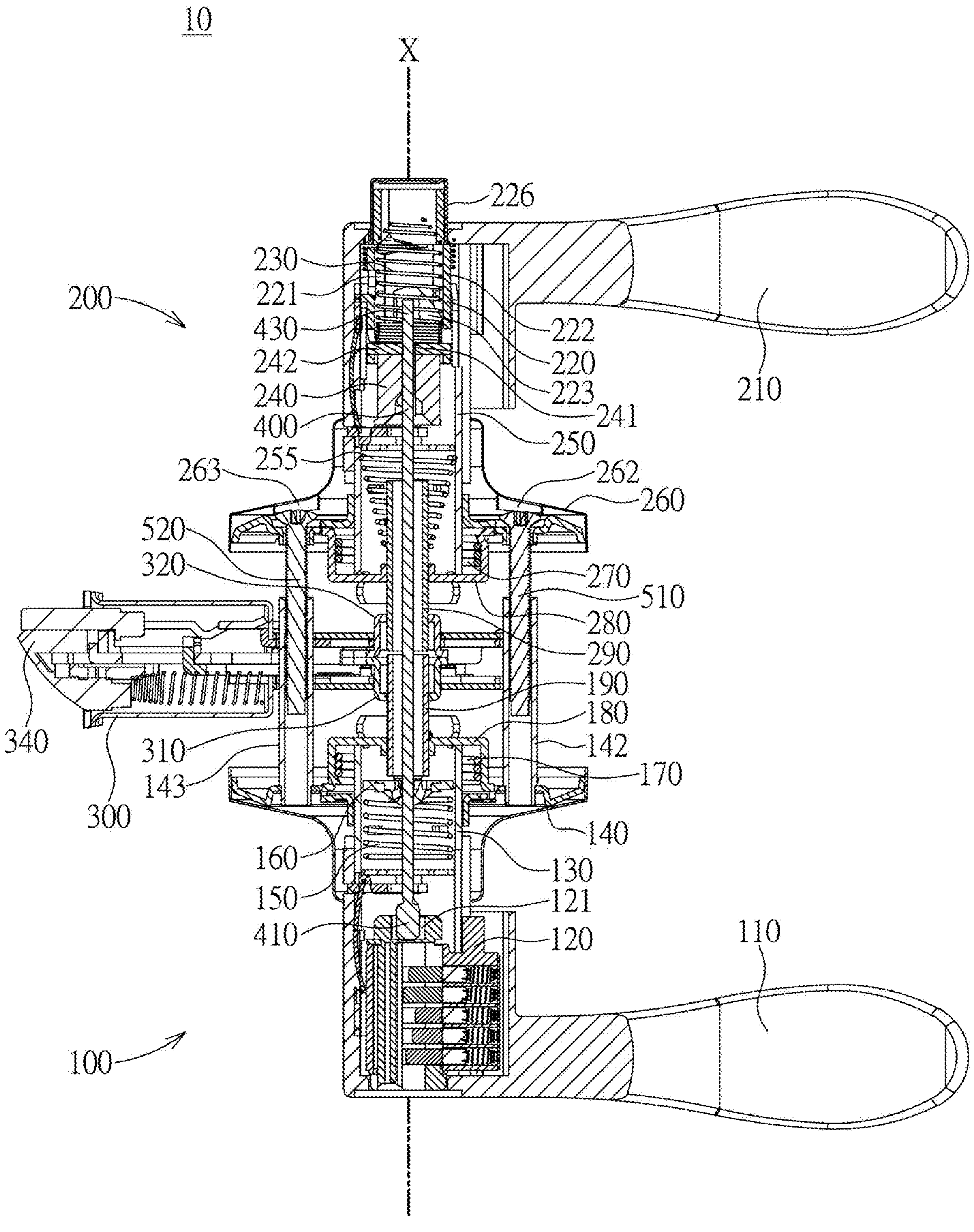
FIG. 6 is a cross-sectional view of the lock taken along line B-B in FIG. 4.

The first axial tube 130 is inserted in a center hole (not labelled) of the first cover plate 140 in a manner that the first axial tube 130 is capable of rotating relative to the first cover plate 140. Two ends of the first axial tube 130 protrude from two sides of the first cover plate 140, respectively. The first axial tube 130 includes a spacer 132 (shown in FIG. 5). The spacer 132 divides the inner space of the first axial tube 130 into a first accommodating space 133 and a second accommodating space 134. The first accommodating space 133 is for accommodating the lock element 120. The second accommodating space 134 is for accommodating the first elastic element 150 and the moving component 160. As shown in FIGS. 5 and 6, the first elastic element 150 and the moving component 160 are disposed in the first cover plate 140 through the first axial tube 130. An inner end of the first axial tube 130 can further include two limiting grooves 135 (shown in FIG. 2, wherein only one of the limiting grooves 135 is labelled) and four hooks 131. An extending direction of the limiting groove 135 is substantially parallel to the rotating axis X. The four hooks 131 are disposed at a terminal of the inner end of the first axial tube 130.

The first cover plate 140 is fixedly disposed on a side of the door. The first cover plate 140 includes a first fixing part 142, a second fixing part 143, two first fitting portions 144 (shown in FIG. 11), a first limiting post 145 and a second limiting post 146. The first fixing part 142, the second fixing part 143, the first limiting post 145 and the second limiting post 146 are extended from a surface (not labelled) of the first cover plate 140 along the rotating axis X. The two first fitting portions 144 are disposed symmetrically and are concaved from the surface of the first cover plate 140. The first fixing part 142 and the second fixing part 143 are configured to corporate with the first fixing element 510 and the second fixing element 520 to combine the first handle set 100 and the second handle set 200, such that the first handle set 100, the second handle set 200 and the latch mechanism 300 can be fixed on the door. In the embodiment, the first fixing element 510 and the second fixing element 520 are screws, and the first fixing part 142 and the second fixing part 143 are screw posts. However, the present disclosure is not limited thereto. The first fixing part 142, the second fixing part 143, the first fixing element 510 and the second fixing element 520 which can corporate with each other to achieve the aforementioned effect are all within the scope of the present disclosure.

Figure 8:
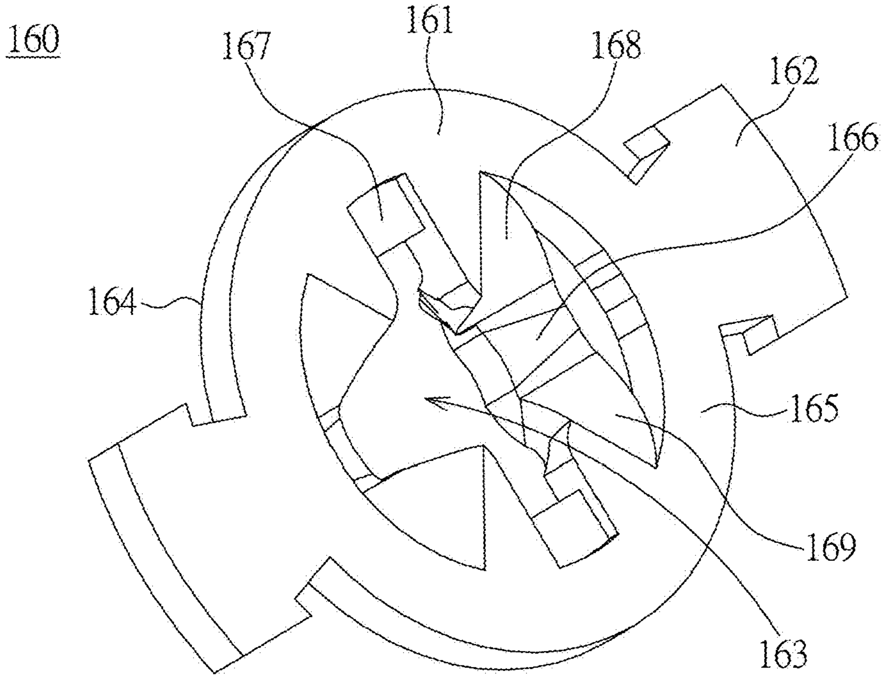
FIG. 8 is a three-dimensional diagram showing a moving component of FIG. 2.
Figure 9:
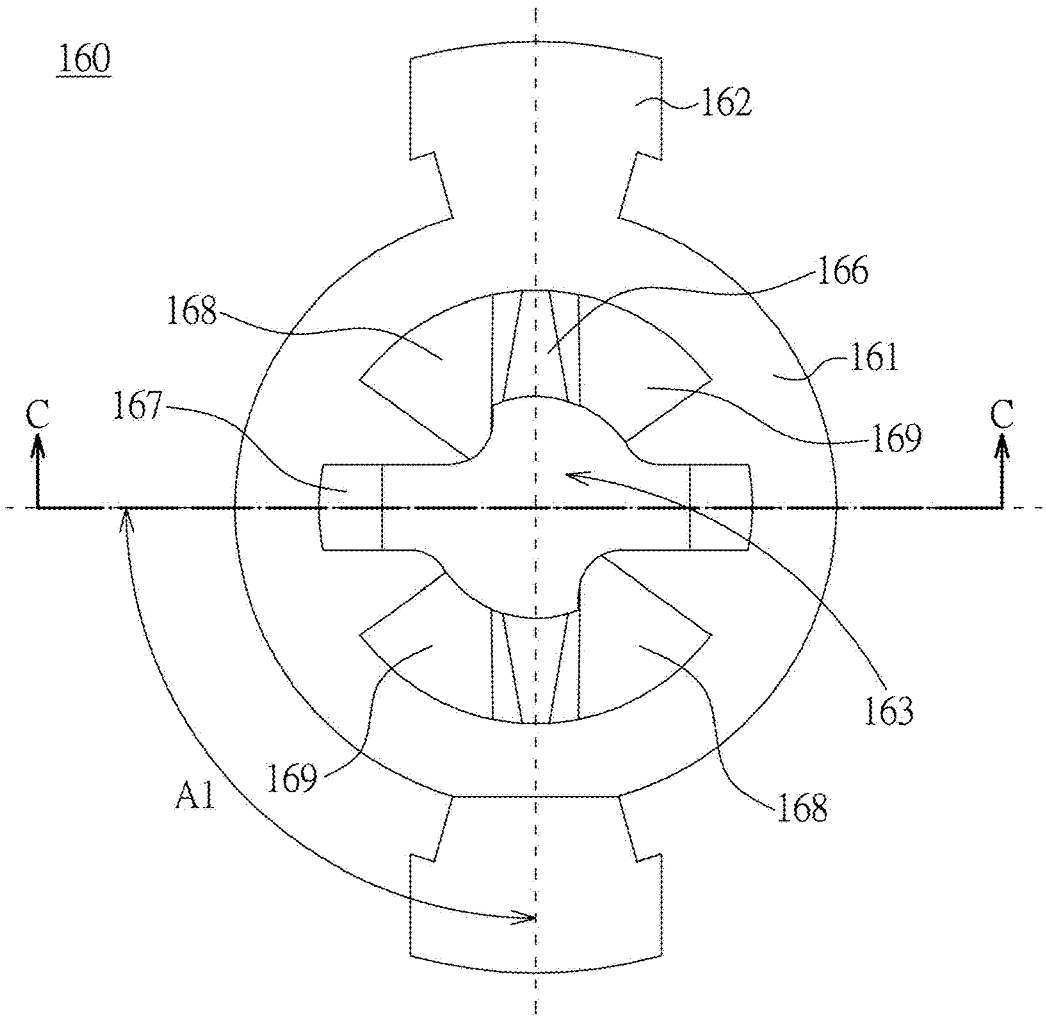
FIG. 9 is a plane view showing the moving component of FIG.
Figure 10:
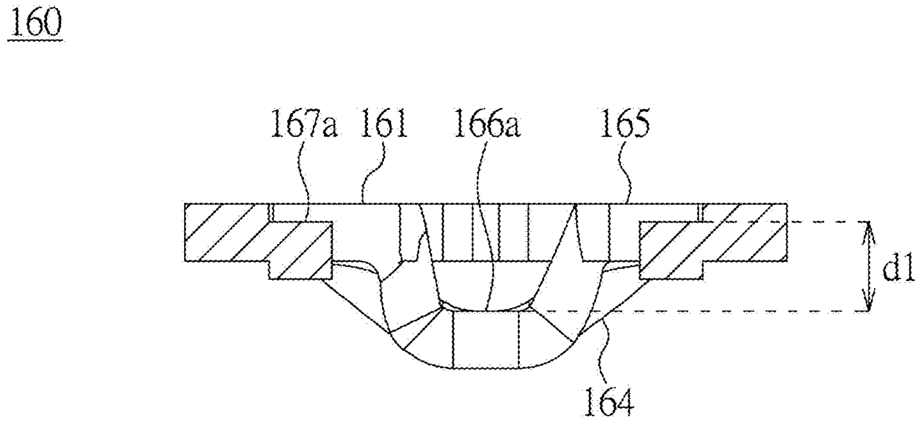
FIG. 10 is a cross-sectional view of the moving component taken along line C-C in FIG. 8.

Please refer to FIG. 8 to FIG. 10. The moving component 160 has a first side 164 and a second side 165 opposite to the first side 164. The first side 164 is abutted against the first elastic element 150. The moving component 160 includes a main body 161 and two second fitting portions 162. The two second fitting portions 162 are extended outwardly from the main body 161 along a direction perpendicular to the rotating axis X. The two second fitting portions 162 are disposed symmetrically with each other and are corresponding to the two first fitting portions 144, respectively. The main body 161 of the moving component 160 is disposed in the second accommodating space 134 of the first axial tube 130. The two second fitting portions 162 protrude from the two limiting grooves 135 of the first axial tube 130, respectively. As such, the moving component 160 is incapable of rotating relative to the first axial tube 130, and is connected to the first axial tube 130 in a manner that the moving component 160 and the first axial tube 130 are capable of moving synchronously. The moving component 160 further includes a through hole 163, two first engaging grooves 166 and two second engaging grooves 167. The through hole 163 communicates the first side 164 and the second side 165. The two first engaging grooves 166 are formed on the second side 165 of the moving component 160, and are disposed symmetrically at two sides of the through hole 163. The two second engaging grooves 167 are formed on the second side 165 of the moving component 160, and are disposed symmetrically at the two sides of the through hole 163. An included angle A1 is between the first engaging groove 166 and the second engaging groove 167. The included angle A1 can be greater than 0 degree and less than or equal to 90 degrees. In the embodiment, the included angle A1 is 90 degrees. The first engaging groove 166 includes a first bottom **166*a*. The second engaging groove 167 includes a second bottom 167*a*. A distance d1 is between the first bottom 166*a* and the second bottom 167*a* along the rotating axis X. The moving component 160 can further include two guiding surfaces 168 and two stop surfaces 169. The two guiding surfaces 168 are formed on the second side 165. Each of the guiding surfaces 168 is disposed on a side of the first engaging groove 166, and located between the first engaging groove 166 and the second engaging groove 167. The guiding surface 168 is for guiding the abutting portion 420 of the transmission element 400 to move from the first engaging groove 166 to the second engaging groove 167 therethrough, or guiding the abutting portion 420 of the transmission element 400 to move from the second engaging groove 167 to the first engaging groove 166 therethrough. Two stop surfaces 169 are formed on the second side 165. Each of the stop surfaces 169 is opposite to one of the guiding surfaces 168 and is disposed on another side of the first engaging groove 166. The stop surface 169 is for stopping the abutting portion 420 of the transmission element 400 to move from the first engaging groove 166 to the second engaging groove 167 therethrough, or stopping the abutting portion 420 of the transmission element 400 to move from the second engaging groove 167 to the first engaging groove 166 therethrough. The two sides of the first engaging groove 166 are respectively disposed with the guiding surface 168 and the stop surface 169, which is for limiting a rotation direction of the transmission element 400, and details thereof can refer to description related to FIGS. 11 and 12. Moreover, the moving component 160 can be made of metal. The moving component 160** can be produced by sheet metal process, which is favorable for reducing production cost.

Figure 2:
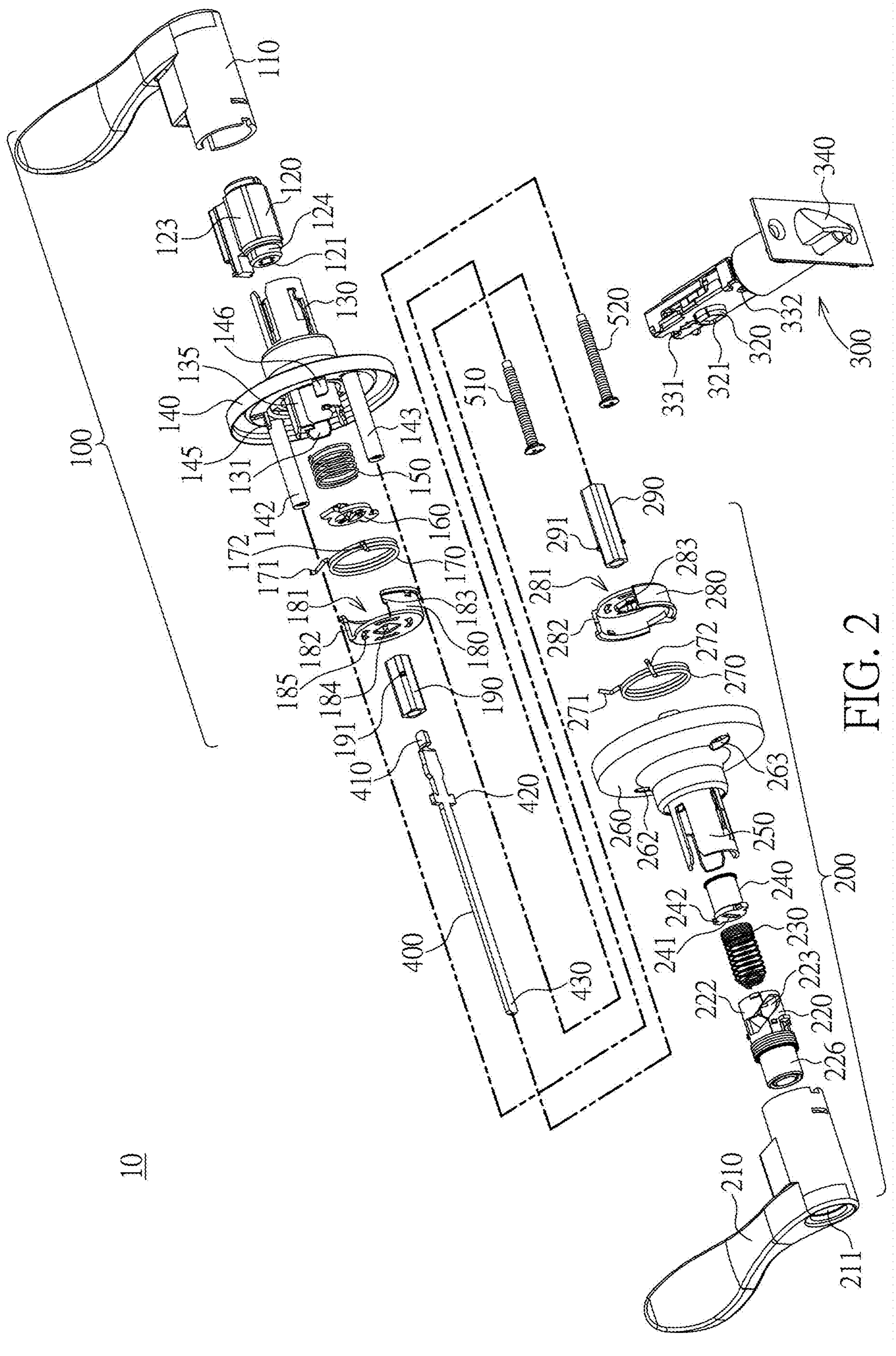
FIG. 2 is an exploded diagram showing the lock of FIG. 1.
Figure 3:
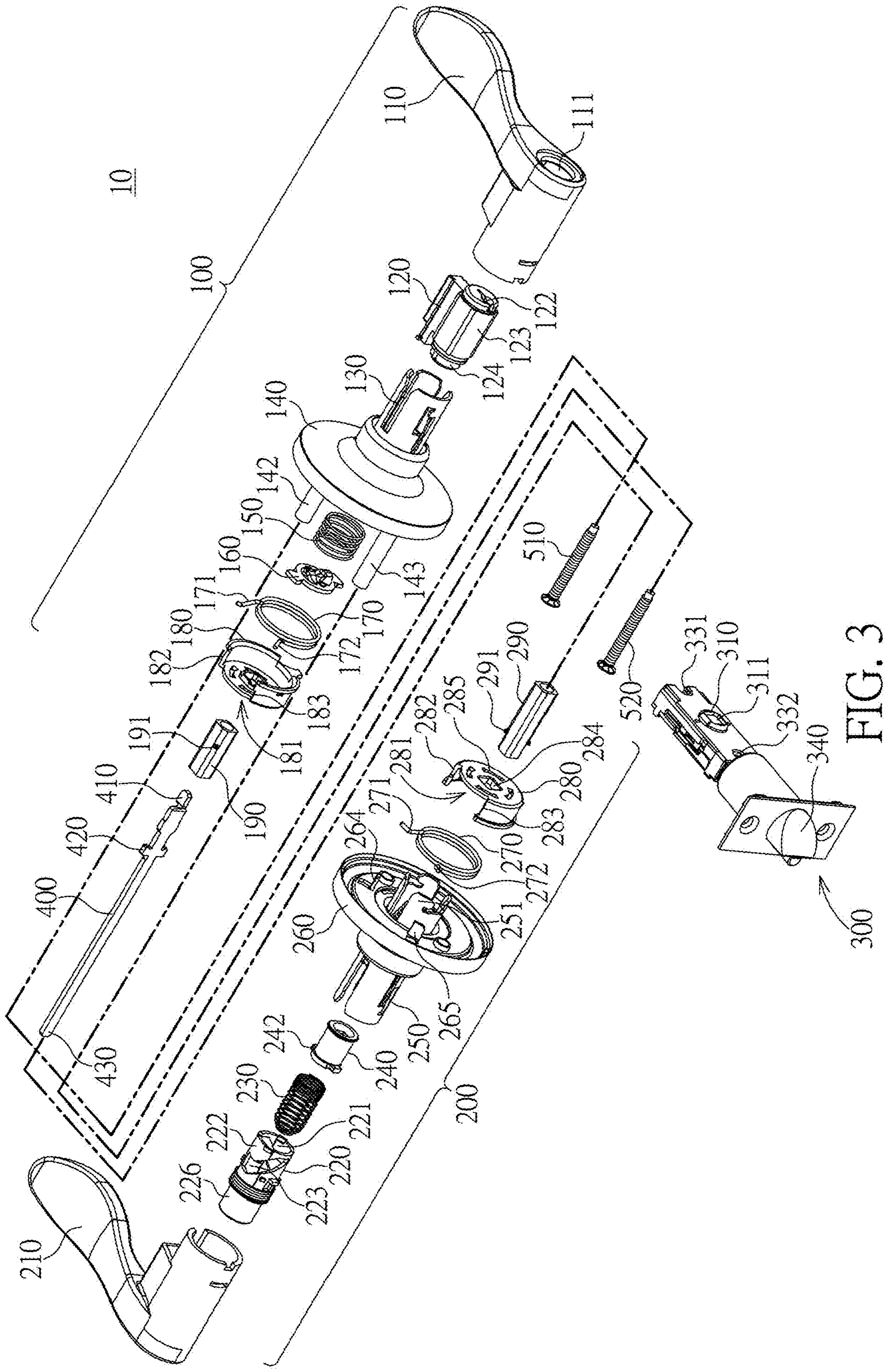
FIG. 3 is another exploded diagram showing the lock of FIG. 1.
Figure 4:
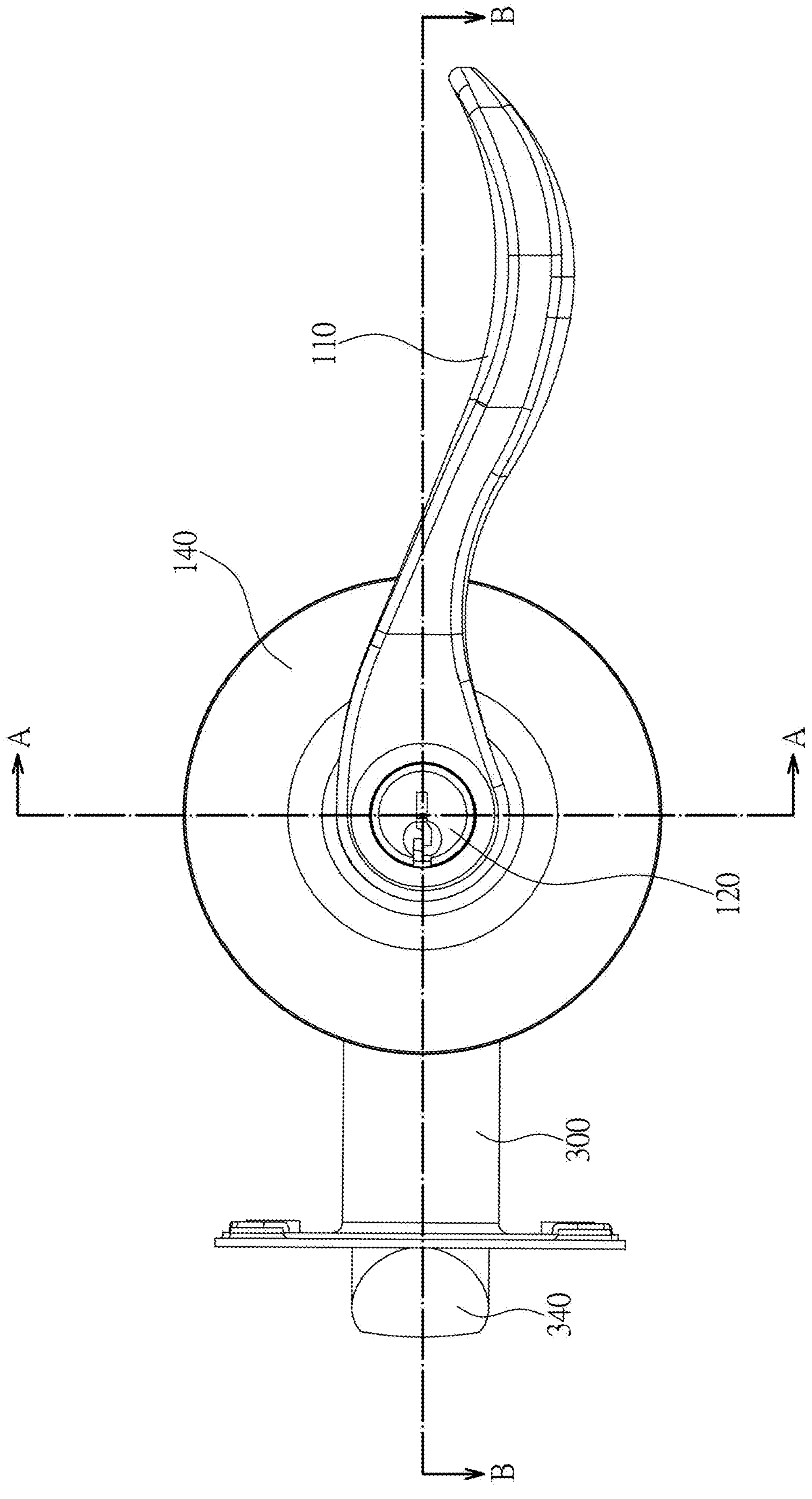
FIG. 4 is a plane view showing the lock of FIG. 1.
Figure 7:
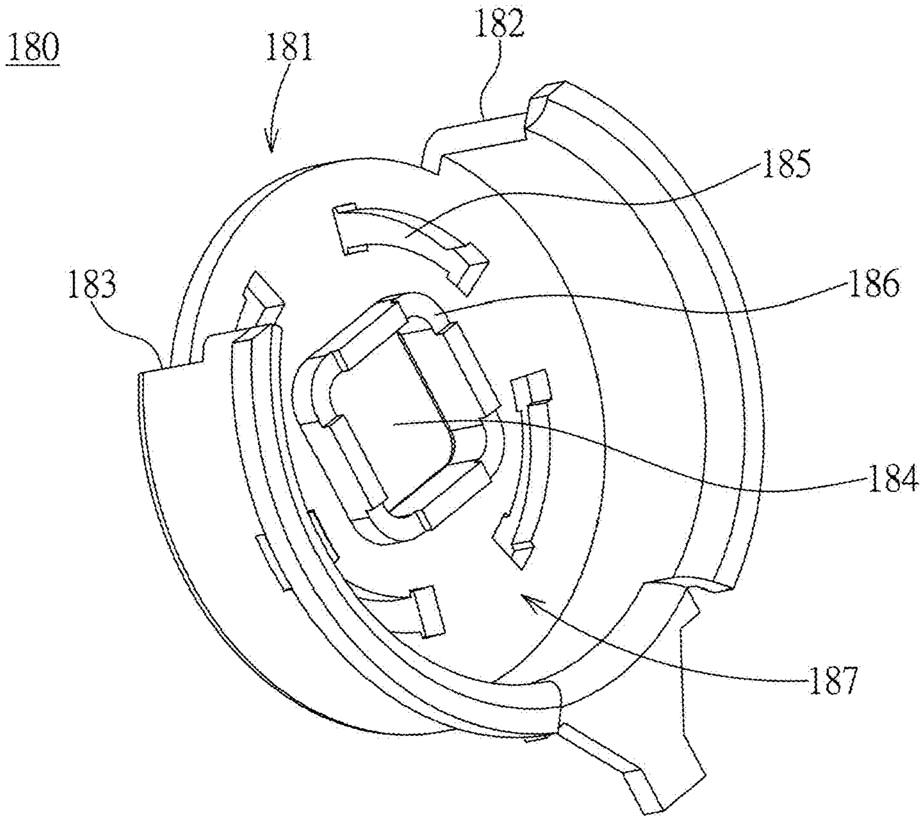
FIG. 7 is a three-dimensional diagram showing a first driving element of FIG. 2.

The first restoring element 170 includes a first leg 171 and a second leg 172. The first restoring element 170 surrounds the inner end of the first axial tube 130. Please refer to FIG. 7. The first driving element 180 includes an inner space 187, a center hole 184, four hook slots 185, four first engaging parts 186 and a limiting slot 181. The limiting slot 181 includes a first end 182 and a second end 183. The inner space 187 is for accommodating the first restoring element 170. The limiting slot 181 is configured to allow the first leg 171 and the second leg 172 of the first restoring element 170 to limitedly move therein. The four hook slots 185 are configured for being engaged with the four hooks 131 of the first axial tube 130. As such, the first elastic element 150, the moving component 160 and the first restoring element 170 are fixed between the spacer 132 and the first driving element 180. The first tubular element 190 is a tubular structure and includes two second engaging parts 191 disposed symmetrically (only one is shown in FIG. 2). The first tubular element 190 is inserted in and protrudes from the center hole 184 of the first driving element 180, and two of the second engaging parts 191 are engaged with two of the first engaging parts 186, respectively. As such, the first tubular element 190 is engaged with the first driving element 180 and incapable of being separated from the center hole 184 of the first driving element 180. In the embodiment, each of the second engaging parts 191 is a raised structure, and each of the first engaging parts 186 is a recessed structure corresponding to the raised structure. However, the present disclosure is not limited thereto. For example, in other embodiment, each of the second engaging parts 191 can be a recessed structure, and each of the first engaging parts 186 can be a raised structure corresponding to the recessed structure.

With the aforementioned structure, when the first handle 110 is rotated, the first axial tube 130 is driven to rotate together, and the moving component 160, the first driving element 180 and the first tubular element 190 are also driven to rotate together. In other words, the first handle 110, the first axial tube 130, the moving component 160, the first driving element 180 and the first tubular element 190 are connected and capable of moving synchronously with each other. The first restoring element 170 is cooperated with the first limiting post 145, the second limiting post 146 and the limiting slot 181 to provide a restoring force for the first driving element 180, such that the first handle 110 can return to an initial position before being rotated. Specifically, when the first handle 110 is pushed downwardly, the first handle 110 is rotated counterclockwise (the sightline is from inside to outside of the first handle set 100), the first driving element 180 is driven to rotate counterclockwise with the first handle 110, the first leg 171 of the first restoring element 170 is blocked by the first limiting post 145 and is incapable of rotating. The second leg 172 of the first restoring element 170 is pushed by the second end 183 of the limiting slot 181 and is rotated counterclockwise with the first driving element 180. As such, the first restoring element 170 accumulates an elastic force. When first handle 110 is released, the first restoring element 170 releases the elastic force which allows the second leg 172 of the first restoring element 170 to push the second end 183 of the limiting slot 181, such that the first driving element 180 is driven to rotate clockwise to drive the first handle 110 to rotate clockwise and return to the initial position before being rotated.

The second handle set 200 includes, in order from outside to inside, a second handle 210, a cylindrical element 220, a second elastic element 230, a movable element 240, a second axial tube 250, a second cover plate 260, a second restoring element 270, a second driving element 280 and a second tubular element 290. The second handle 210 surrounds an outer end of the second axial tube 250, and is connected to the second axial tube 250 in a manner that the second handle 210 and the second axial tube 250 are capable of moving synchronously. For example, the second handle 210 can be connected to the second axial tube 250 through engagement, such that the second handle 210 is capable of rotating with the second axial tube 250. An inner end of the second handle 210 is inserted between the second axial tube 250 and the second cover plate 260 (shown in FIG. 5), such that the second handle 210 is connected to the second cover plate 260 in a manner that the second handle 210 is capable of rotating relative to the second cover plate 260. The second handle 210 includes a penetrating hole 211. The cylindrical element 220 is disposed in the second handle 210.

Figure 11:
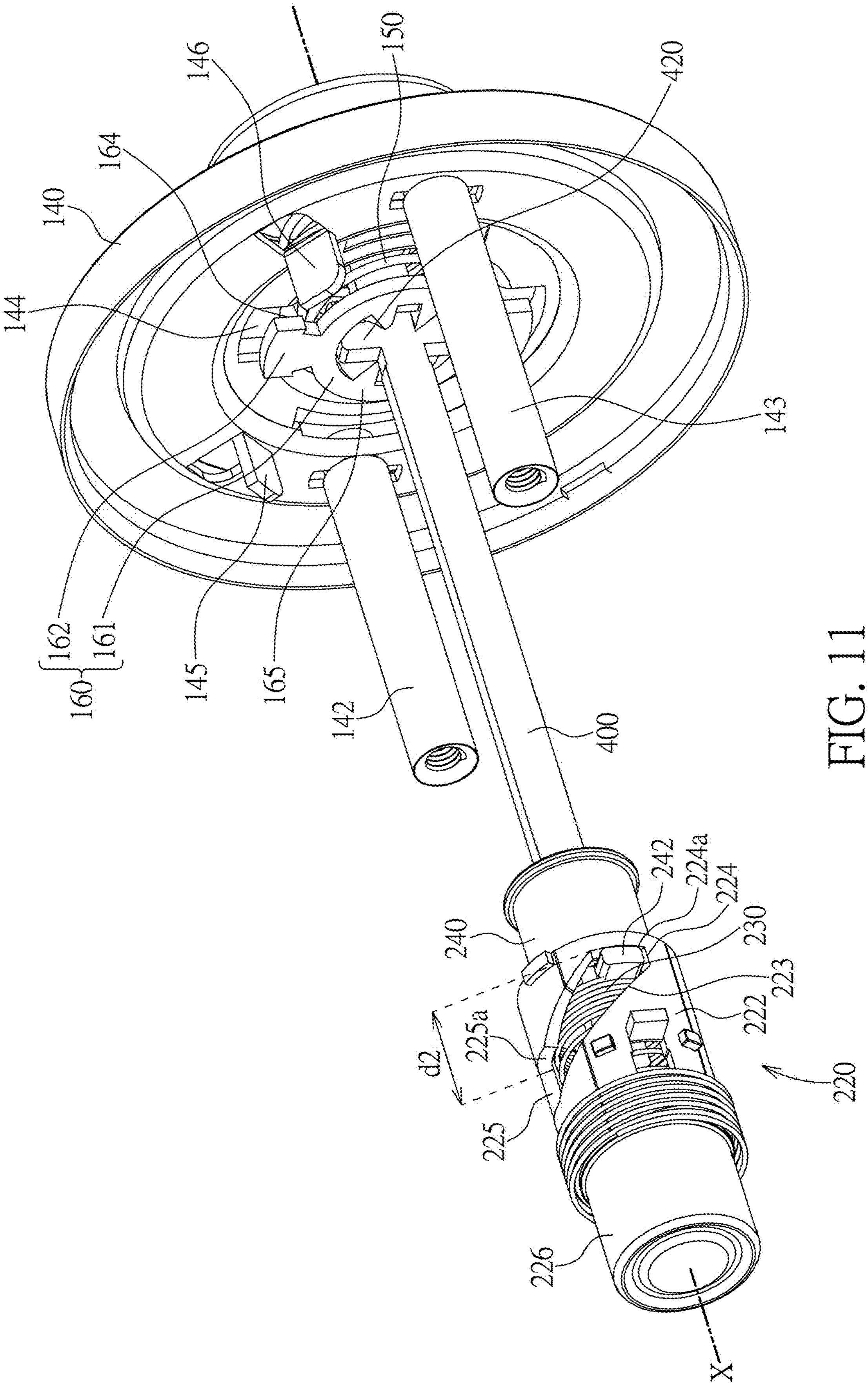
FIG. 11 is a schematic diagram showing a first cover plate, a first elastic element, the moving component, a transmission element, a movable element, a cylindrical element and a second elastic element of FIG. 2 in an unlocked state.
Figure 12:
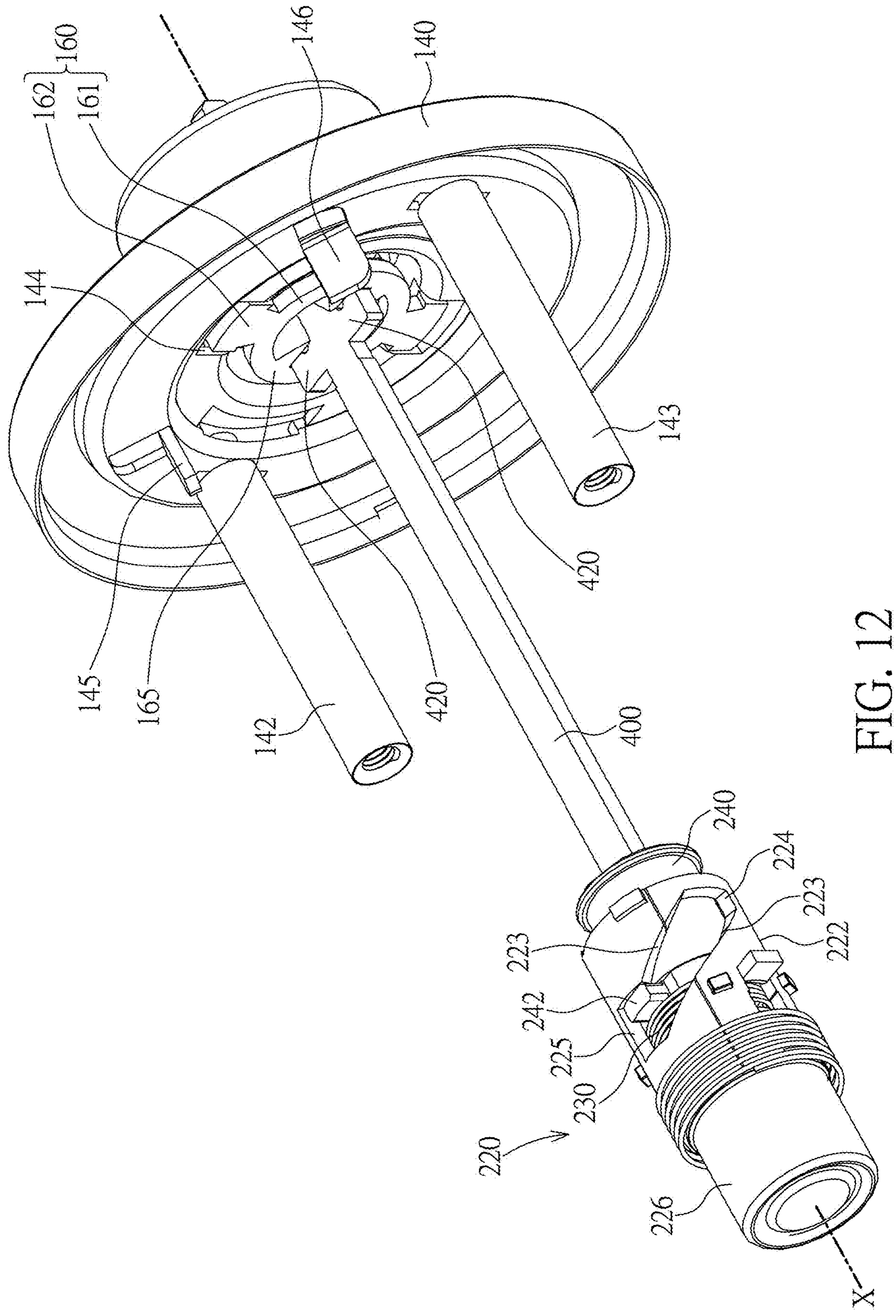
FIG. 12 is a schematic diagram showing the first cover plate, the first elastic element, the moving component, the transmission element, the movable element, the cylindrical element and the second elastic element of FIG. 2 in a locked state.

Please also refer to FIGS. 11 and 12. The cylindrical element 220 includes a receiving space 221 (shown in FIG. 3), a cylindrical wall 222, two guiding tracks 223 and a button 226. The cylindrical wall 222 surrounds the receiving space 221. Each of the guiding tracks 223 is disposed on the cylindrical wall 22 and oblique relative to the rotating axis X. Each of the guiding tracks 223 has an unlocked end 224 and a locked end 225 opposite to the unlock end 224. The phrase "each of the guiding tracks 223 is disposed on the cylindrical wall 222 and oblique relative to the rotating axis X" refers that each of the guiding tracks 223 is not parallel to the rotating axis X nor perpendicular to the rotating axis X, i.e., an included angle (not shown) is between each of the guiding tracks 223 and the rotating axis X. The included angle is greater than 0 degree and is less than 90 degrees, or the included angle is greater than 90 degrees and is less than 180 degrees. More specifically, a distance d2 is between a bottom 224*a* of the unlocked end 224 and a bottom 225*a* of the locked end 225 along the rotating axis X. When the unlocked end 224 and the locked end 225 are projected to a plane (not shown) perpendicular to the rotating axis X, a projecting position of the unlocked end 224 is different from a projecting position of the locked end 225. The button 226 is exposed to outside through the penetrating hole 211 of the second handle 210, and the button 226 has a protruding height H (shown in FIG. 1) relative to an outer side of the second handle 210.

The second elastic element 230 is disposed in the receiving space 221 of the cylindrical element 220. The second elastic element 230 abuts against the movable element 240. The movable element 240 is disposed in the cylindrical element 220 in a manner that the movable element 240 is capable of moving along the guiding track 223. The movable element 240 includes a limiting hole 241 and two guiding parts 242. The two guiding parts 242 are movably disposed in the two guiding tracks 223, respectively. Specifically, the guiding part 242 is capable of moving from the unlocked end 224 to the locked end 225 through the guiding track 223, or from the locked end 225 to the unlocked end 224 through the guiding track 223. In the embodiment, each of the guiding parts 242 is a lug structure and extended outwardly along a direction perpendicular to the rotating axis X. Each of the guiding tracks 223 is a groove structure formed on the cylindrical wall 222. However, the present disclosure is not limited thereto. The guiding parts 242 which is capable of moving from the unlocked end 224 to the locked end 225 or from the locked end 225 to the unlocked end 224 by the guidance of the guiding track 223 are all within the scope of the present disclosure.

The second axial tube 250 is inserted in a center hole (not labelled) of the second cover plate 260 in a manner that the second axial tube 250 is capable of rotating relative to the second cover plate 260. Two ends of the second axial tube 250 protrude from two sides of the second cover plate 260, respectively. The second axial tube 250 includes a spacer 252 (shown in FIG. 5). The spacer 252 divides the inner space of the second axial tube 250 into a first accommodating space 253 and a second accommodating space 254. The first accommodating space 253 is for accommodating the cylindrical element 220, the second elastic element 230 and the movable element 240. The second accommodating space 254 is for accommodating a third elastic element 255. The third elastic element 255 is for providing an elastic force to the second tubular element 290, such that the second tubular element 290 is capable of abutting against the second transfer shaft 320, which can enhance the transmission efficiency between the second tubular element 290 and the second transfer shaft 320. An inner end of the second axial tube 250 can further include four hooks 251. The four hooks 251 are disposed at a terminal of the inner end of the second axial tube 250.

The second cover plate 260 includes a first penetrating hole 262 and a second penetrating hole 263. The first penetrating hole 262 is provided for the first fixing element 510 to insert therethrough. The second penetrating hole 263 is provided for the second fixing element 520 to insert therethrough. The inner side of the second cover plate 260 includes a first limiting post 264 and a second limiting post 265. The first limiting post 264 and the second limiting post 265 protrude from a surface (not labelled) of the second cover plate 260 and are extended along the rotating axis X.

The second restoring element 270 includes a first leg 271 and a second leg 272. The second restoring element 270 surrounds the inner end of the second axial tube 250. The structure of the second driving element 280 is the same as that of the first driving element 180. For details of the elements of the second driving element 280, references can be made to the elements having the same name of the first driving element 180. The second driving element 280 includes an inner space (not labelled), a center hole 284, four hook slots 285, four first engaging parts (not shown) and a limiting slot 281. The limiting slot 281 includes a first end 282 and a second end 283. The inner space is for accommodating the second restoring element 270. The limiting slot 281 is configured to allow the first leg 271 and the second leg 272 of the second restoring element 270 to move limitedly therein. The four hook slots 285 are configured for being engaged with the four hooks 251 of the second axial tube 250. As such, the third elastic element 255 and the second restoring element 270 are fixed between the spacer 252 and the second driving element 280. The second tubular element 290 is a tubular structure and includes two second engaging parts 291 disposed symmetrically. The second tubular element 290 is inserted in and protrudes from the center hole 284 of the second driving element 280, and the two second engaging parts 291 are engaged with two of the first engaging parts of the second driving element 280, respectively. As such, the second tubular element 290 is engaged with the second driving element 280 and incapable of being separated from the center hole 284 of the second driving element 280.

With the aforementioned structure, when the second handle 210 is rotated, the second axial tube 250 is driven to rotate together, and the second driving element 280 and the second tubular element 290 are also driven to rotate together. In other words, the second handle 210, the second axial tube 250, the second driving element 280 and the second tubular element 290 are connected and capable of moving synchronously with each other. The second restoring element 270 is cooperated with the first limiting post 264, the second limiting post 265 and the limiting slot 281 to provide a restoring force to the second driving element 280, such that the second handle 210 can return to an initial position before being rotated. Specifically, when the second handle 210 is pushed downwardly, the second handle 210 is rotated counterclockwise (the sightline is from outside to inside of the second handle set 200), the second driving element 280 is driven to rotate counterclockwise, the first leg 271 of the second restoring element 270 is blocked by the first limiting post 264 and is incapable of rotating. The second leg 272 of the second restoring element 270 is pushed by the second end 283 of the limiting slot 281 and is rotated counterclockwise with the second driving element 280. As such, the second restoring element 270 accumulates an elastic force. When second handle 210 is released, the second restoring element 270 releases the elastic force which allows the second leg 272 of the second restoring element 270 to push the second end 283 of the limiting slot 281, such that the second driving element 280 is driven to rotate clockwise to drive the second handle 210 to rotate clockwise and return to the initial position before being rotated. In other embodiment, the second restoring element 270 can be omitted. A user can directly rotate the second handle 210 clockwise to bring the second handle 210 return to the initial position before being rotated.

The latch mechanism 300 includes a first transfer shaft 310, a second transfer shaft 320, a first hole 331, a second hole 332 and a latch tongue 340. The first transfer shaft 310 defines a first transfer hole 311 for being inserted with the first tubular element 190. In the embodiment, cross sections of the first transfer hole 311 and the first tubular element 190 are square, such that the first tubular element 190 is connected to the first transfer shaft 310 in a manner that the first tubular element 190 and the first transfer shaft 310 are capable of moving synchronously. However, the present disclosure is not limited thereto. In other embodiment, the cross sections of the first transfer hole 311 and the first tubular element 190 can be formed in other shapes, such as semicircular shapes, triangular shapes or pentagonal shapes. The cross sections of the first transfer hole 311 and the first tubular element 190 which disable the first tubular element 190 and the first transfer shaft 310 to rotate relative to each other are all within the scope of the present disclosure. The second transfer shaft 320 defines a second transfer hole 321 for being inserted with the second tubular element 290. In the embodiment, cross sections of the second transfer hole 321 and the second tubular element 290 are square, such that the second tubular element 290 is connected to the second transfer shaft 320 in a manner that the second tubular element 290 and the second transfer shaft 320 are capable of moving synchronously. However, the present disclosure is not limited thereto. In other embodiment, the cross sections of the second transfer hole 321 and the second tubular element 290 can be formed in other shapes. The cross sections of the second transfer hole 321 and the second tubular element 290 which disable the second tubular element 290 and the second transfer shaft 320 to rotate relative to each other are all within the scope of the present disclosure. As shown in FIGS. 5 and 6, the first tubular element 190 and the second tubular element 290 are independent from each other, i.e., when the first tubular element 190 is rotated, the second tubular element 290 does not rotate with the first tubular element 190, and vice versa. The first transfer shaft 310 is independent from the second transfer shaft 320, i.e., when the first transfer shaft 310 is rotated, the second transfer shaft 320 does not rotate with the first transfer shaft 310, and vice versa. Specifically, when the first handle 110 is rotated, the first tubular element 190 is driven to rotate with the first handle 110, which drives the first transfer shaft 310 to drive the latch tongue 340 to retract or stretch out. Similarly, when the second handle 210 is rotated, the second tubular element 290 is driven to rotate with the second handle 210, which drives the second transfer shaft 320 to drive the latch tongue 340 to retract or stretch out. In other words, the latch tongue 340 can be driven to retract or stretch out by the first tubular element 190 or the second tubular element 290. How the first transfer shaft 310 and the second transfer shaft 320 driving the latch tongue 340 to retract or stretch out is conventional, which is not recited herein. The first hole 331 is for being inserted with the first fixing part 142, and the second hole 332 is for being inserted with the second fixing part 143. In the embodiment, a shape of the first hole 331 is different from that of the second hole 332. However, the present disclosure is not limited thereto. In other embodiment, the shape of the first hole 331 can be the same as that of the second hole 332.

Figure 14:
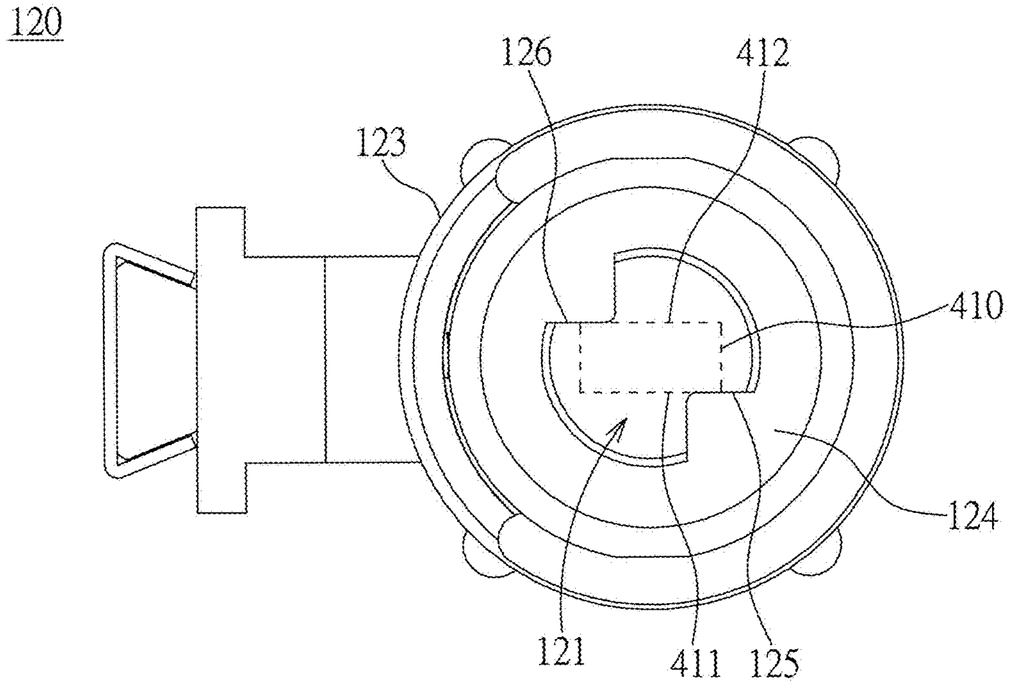
FIG. 14 is a plane view showing the lock element of FIG. 13.

The transmission element 400 has a first end 410 and a second end 430 opposite to the first end 410, and includes two abutting portions 420 for abutting against the moving component 160. The two abutting portions 420 are disposed between the first end 410 and the second end 430, and each of the abutting portions 420 is a lug structure. The lug structure is extended outwardly along a direction perpendicular to the rotating axis X. The transmission element 400 is inserted in the through hole 163 of the moving component 160. The first end 410 of the transmission element 400 is connected to the first handle set 100. The second end 430 of the transmission element 400 is connected to the movable element 240 of the second handle set 200. Specifically, the first end 410 of the transmission element 400 is disposed in the accommodating groove 121 of the lock cylinder 124. Please refer to FIG. 14, in which a cross section of the first end 410 of the transmission element 400 is shown in dashed line for illustrating the connection relationship between the transmission element 400 and the lock element 120. As shown in FIG. 14, the first end 410 of the transmission element 400 is disposed in the accommodating groove 121, and two sides 411, 412 of the first end 410 abut against the first abutting surface 125 and the second abutting surface 126, respectively. As such, the transmission element 400 is connected to the lock cylinder 124 in a manner that the transmission element 400 and the lock cylinder 124 are capable of moving synchronously. When the lock cylinder 124 is operated to rotate (such as unlocking the lock 10 with a key to drive the lock cylinder 124 to rotate), the transmission element 400 can be driven to rotate together. Please refer to FIGS. 5 and 6. The two abutting portions 420 of the transmission element 400 abut against the second side 165 of the moving component 160. The limiting hole 241 is inserted with the second end 430 of the transmission element 400. The second end 430 of the transmission element 400 is connected to the limiting hole 241 in a manner that the second end 430 of the transmission element 400 and the limiting hole 241 are capable of moving synchronously. In the embodiment, across section of the second end 430 is rectangular, and a cross section of the limiting hole 241 is rectangular. As such, when the movable element 240 is operated to rotate, the transmission element 400 can be driven to rotate together. Furthermore, as shown in FIGS. 5 and 6, the first end 410 and the abutting portions 420 of the transmission element 400 are abutted against by the accommodating groove 121 and the first tubular element 190, respectively. As such, the transmission element 400 is incapable of moving along the rotating axis X (hereinafter, also called axial movement). Accordingly, when the transmission element 400 is operated to lock or unlock the lock 10, the operation resistance can be reduced, and the operation smoothness can be enhanced.

Please refer to FIG. 11, when the lock 10 is in an unlocked state, the relationship of the first cover plate 140, the first elastic element 150, the moving component 160, the transmission element 400, the movable element 240, the second elastic element 230 and the cylindrical element 220 is shown in FIG. 11. When the abutting portions 420 of the transmission element 400 are located in the first engaging grooves 166, the moving component 160 is pushed by the first elastic element 150, such that the second fitting portions 162 are separated from the first fitting portions 144. The guiding parts 242 of the movable element 240 are pushed by the second elastic element 230 to locate at the unlocked ends 224. Because the second fitting portions 162 are not fitted into the first fitting portions 144, the moving component 160 is capable of moving relative to the first cover plate 140. Due to the fact that the moving component 160 is connected to the first handle 110 in a manner that the moving component 160 and the first handle 110 are capable of moving synchronously, the first handle 110 is capable of rotating relative to the first cover plate 140, too. In other words, when the lock 10 is in the unlocked state, the first handle 110 is capable of rotating relative to the first cover plate 140, such that the latch tongue 340 can be driven to retract to allow the door to be opened.

Please refer to FIG. 12, when the lock 10 is in a locked state, the relationship of the first cover plate 140, the first elastic element 150, the moving component 160, the transmission element 400, the movable element 240, the second elastic element 230 and the cylindrical element 220 is shown in FIG. 12. When the abutting portions 420 of the transmission element 400 are located in the second engaging grooves 167, the moving component 160 is pushed by the abutting portions 420 of the transmission element 400 so as to compress the first elastic element 150, which allows the first elastic element 150 to accumulate an elastic force and allows the second fitting portions 162 to fit into the first fitting portions 144, such that guiding parts 242 of the movable element 240 are guided by the guiding tracks 223 to locate at the locked ends 225. Because the second fitting portions 162 are fitted into the first fitting portions 144, the moving component 160 is incapable of rotating relative to the first cover plate 140. Due to the fact that the moving component 160 is connected to the first handle 110 in a manner that the moving component 160 and the first handle 110 are capable of moving synchronously, the first handle 110 is incapable of rotating relative to the first cover plate 140, either. In other words, when the lock 10 is in the locked state, the first handle 110 is incapable of rotating relative to the first cover plate 140 and incapable of driving the latch tongue 340 to retract to allow the door to be opened.

The lock 10 can be locked by turning a key (not shown) inserted in the keyhole 122 to drive the lock cylinder 124 to rotate, or the lock 10 can be locked by pressing the button 226, such that the lock 10 can be switched from a state of FIG. 11 to a state of FIG. 12. Specifically, when the lock 10 is in the state of FIG. 11, the lock cylinder 124 can be driven to rotate by turning the key inserted in the keyhole 122, which can drive the transmission element 400 to rotate together. Please also refer to FIG. 9, because the second side 165 of the moving component 160 is disposed with two guiding surfaces 168 and two stop surfaces 169, the transmission element 400 only can rotate counterclockwise (the sightline is from inside to outside of the first cover plate 140) by the guidance of the guiding surfaces 168, such that the abutting portions 420 are moved from the first engaging grooves 166 to the second engaging grooves 167. Furthermore, because the transmission element 400 is incapable of axial movement, and a distance d1 is between the first bottom **166*a* of the first engaging groove 166 and the second bottom 167*a* of the second engaging groove 167 along the rotating axis X, the abutting portions 420 push the moving component 160 to move along the rotating axis X and towards the first elastic element 150 when the abutting portions 420 are moved from the first engaging grooves 166 to the second engaging grooves 167, which allows the second fitting portions 162 to fit into the first fitting portions 144, and allows the first elastic element 150 to accumulate the elastic force. In other words, when the transmission element 400 is driven to rotate and the abutting portions 420 are moved from the first engaging grooves 166 to the second engaging grooves 167, the abutting portions 420 push the moving component 160 to move along the rotating axis X and towards the first elastic element 150, so as to allow the second fitting portions 162 to fit into the first fitting portions 144. Furthermore, when the transmission element 400 rotates counterclockwise, the guiding parts 242 of the movable element 240 are driven to rotate with the transmission element 400, so as to move from the unlocked ends 224 to the locked ends 225 through the guiding tracks 223. At the same time, the cylindrical element 220 moves along the rotating axis X and towards the first handle set 100 by the guidance of the guiding parts 242, so as to drive the button 226 to move with the cylindrical element 220 and towards the first handle set 100. As such, the protruding height H (shown in FIG. 1) is reduced, and the second elastic element 230** accumulates an elastic force.

When the lock 10 is in the state of FIG. 11, the lock 10 can be locked by pressing the button 226 to drive the cylindrical element 220 to move along the rotating axis X and towards the first handle set 100, such that the guiding parts 242 move from the unlocked ends 224 to the locked ends 225 by the guidance of the guiding tracks 223, which allows the second elastic element 230 to accumulate the elastic force, and allows the movable element 240 to rotate to drive the transmission element 400 to rotate. The abutting portions 420 are moved from the first engaging grooves 166 to the second engaging grooves 167 and push the moving component 160 to move along the rotating axis X and towards the first elastic element 150, so as to allow the second fitting portions 162 to fit into the first fitting portions 144 and the first elastic element 150 to accumulate the elastic force. In other words, when the cylindrical element 220 is operated to move along the rotating axis X and towards the first handle set 100, the movable element 240 is driven to move from the unlocked end 224 to the locked end 225 to drive the transmission element 400 to rotate, such that the lock 10 is switched from the unlocked state to the locked state.

When the lock 10 is in the state of FIG. 12, the lock 10 can be unlocked by turning the key (not shown) inserted in the keyhole 122 to drive the lock cylinder 124 to rotate, or the lock 10 can be unlocked by rotating the second handle 210, such that the lock 10 can be switched from the state of FIG. 12 to the state of FIG. 11. Specifically, when the lock 10 is in the state of FIG. 12, the lock cylinder 124 can be driven to rotate by turning the key inserted in the keyhole 122, which can drive the transmission element 400 to rotate together. Please also refer to FIG. 9, because the second side 165 of the moving component 160 is disposed with the two guiding surfaces 168 and the two stop surfaces 169, the transmission element 400 only can rotate clockwise (the sightline is from inside to outside of the first cover plate 140) by the guidance of the guiding surfaces 168, such that the abutting portions 420 are moved from the second engaging grooves 167 to the first engaging grooves 166. Furthermore, because the transmission element 400 is incapable of axial movement, and the distance d1 is between the first bottom 166*a* of the first engaging groove 166 and the second bottom 167*a* of the second engaging groove 167 along the rotating axis X, the first elastic element 150 releases the elastic force to push the moving component 160 to move along the rotating axis X and away from the first elastic element 150 when the abutting portions 420 are moved from the second engaging grooves 167 to the first engaging grooves 166, which allows the second fitting portions 162 to separate from the first fitting portions 144. In other words, when the transmission element 400 is driven to rotate, and the abutting portions 420 are moved from the second grooves 167 to the first grooves 166, the moving component 160 is pushed by the first elastic element 150 to move along the rotating axis X and away from the first elastic member 150, which allows the second fitting portions 162 to separate from the first fitting portions 144. Furthermore, when the transmission element 400 rotates clockwise, the movable element 240 is driven to rotate with the transmission element 400, and the second elastic element 230 releases the elastic force. The guiding parts 242 move from the locked ends 225 to the unlocked ends 224 by the push of the second elastic element 230 and the guidance of the guiding tracks 223. At the same time, the cylindrical element 220 moves along the rotating axis X and towards outside of the second handle set 200. As such, the protruding height H is returned to its original height.

When the lock 10 is in the state of FIG. 12, the lock 10 can be unlocked by pressing the second handle 210 downwardly or pulling the second handle 210 upwardly. When the second handle 210 is pressed downwardly, the second handle 210 can rotate counterclockwise (the sightline is from outside to inside of the second handle set 200) to drive the cylindrical element 220 to rotate with the second handle 210. The second elastic element 230 releases the elastic force. The guiding parts 242 move from the locked ends 225 to the unlocked ends 224 by the push of the second elastic element 230 and the guidance of the guiding tracks 223. At the same time, the cylindrical element 220 moves towards outside of the second handle set 200. As such, the protruding height H is returned to its original height. When the guiding parts 242 move from the locked ends 225 to the unlocked ends 224, the moving component 240 is allowed to rotate to drive the transmission element 400 to rotate clockwise. The abutting portions 420 are moved from the second engaging grooves 167 to the first engaging grooves 166, the first elastic element 150 releases the elastic force to push the moving component 160 to move along the rotating axis X and away from the first elastic element 150, so as to allow the second fitting portions 162 to separate from the first fitting portions 144. In other words, when the second handle 210 is operated to rotate counterclockwise, the cylindrical element 220 is driven to rotate, and the movable element 240 is driven to move from the locked ends 225 to the unlocked ends 224 to drive the transmission element 400 to rotate, such that the lock 10 is switched from the locked state to the unlocked state. Furthermore, when the second handle 210 is pushed downwardly, the second tubular element 290 can be driven to rotate together, which drives the second transfer shaft 320 to rotate, so as to drive the latch tongue 340 to retract. Therefore, when the second handle 210 is pressed downwardly, the lock 10 can be unlocked and the latch tongue 340 can be driven to retract, such that the door can be opened.

When the lock 10 is in the state of FIG. 12, and the second handle 210 is pulled upwardly, the second handle 210 can rotate clockwise (the sightline is from outside to inside of the second handle set 200) to drive the cylindrical element 220 to rotate with the second handle 210. The locked ends 225 of the guiding tracks 223 pushed the guiding parts 242, the movable element 240 is allowed to rotate with the cylindrical element 220 and drive the transmission element 400 to rotate clockwise, such that the abutting portions 420 are moved from the second engaging grooves 167 to the first engaging grooves 166, the moving component 160 is pushed by the first elastic element 150 to move along the rotating axis X and away from the first elastic element 150, so as to allow the second fitting portions 162 to separate from the first fitting portions 144. In other words, when the second handle 210 is operated to rotate clockwise, the cylindrical element 220 is driven to rotate, and the movable element 240 is driven to rotate clockwise with the cylindrical element 220 to drive the transmission element 400 to rotate, such that the lock 10 is switched from the locked state to the unlocked state. Furthermore, when the second handle 210 is pulled upwardly, the second tubular element 290 can be driven to rotate together, which drives the second transfer shaft 320 to rotate, so as to drive the latch tongue 340 to retract. Therefore, when the second handle 210 is pulled upwardly, the lock 10 can be unlocked and the latch tongue 340 can be driven to retract, such that the door can be opened.

Compared to the prior art, the lock of the present disclosure has the first tubular element being connected to the first handle in a manner that the first tubular element and the first handle are capable of moving synchronously, and the second tubular element being connected to the second handle in a manner that the second tubular element and the second handle are capable of moving synchronously. Moreover, the second tubular element is independent from the first tubular element, such that the first handle and the second handle are capable of independently driving the latch tongue. According to the lock of the present disclosure, when assembling the first tubular element, the second tubular element and the transmission element, it only requires to insert the transmission element in the first tubular element and the second tubular element, respectively. As such, the structure of the lock is simple, and the lock can be assembled easily. According to the lock of the present disclosure, the lock can be unlocked by pressing the second handle downwardly or pulling the second handle upwardly. As such, the lock has the advantage of labor saving and can be unlocked quickly. When the transmission element is arranged to rotate along the rotating axis without axial movement, the operation resistance can be reduced, and the operation smoothness can be enhanced. When the moving component is made of metal, the moving component can be produced by sheet metal process, which is favorable for reducing production cost.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A lock defining a rotating axis and for being installed on a door, the lock comprising:

a first handle set disposed on a side of the door, the first handle set comprising:
a first handle; and
a first tubular element connected to the first handle in a manner that the first tubular element and the first handle are capable of moving synchronously;
a second handle set disposed on another side of the door, the second handle set comprising:
a second handle;
a cylindrical element disposed in the second handle, the cylindrical element comprising a guiding track, the guiding track having an unlocked end and a locked end opposite to the unlocked end;
a movable element disposed in the cylindrical element in a manner that the movable element is capable of moving along the guiding track; and
a second tubular element connected to the second handle in a manner that the second tubular element and the second handle are capable of moving synchronously, the second tubular element being independent from the first tubular element;
a transmission element having a first end and a second end opposite to the first end, the first end being connected to the first handle set, the second end being connected to the movable element; and
a latch mechanism disposed between the first handle set and the second handle set, the latch mechanism comprising a latch tongue, the first tubular element being capable of driving the latch tongue, and the second tubular element being capable of driving the latch tongue;
wherein when the cylindrical element is operated to move along the rotating axis and towards the first handle set, the movable element is driven to move from the unlocked end to the locked end to drive the transmission element to rotate, such that the lock is switched from an unlocked state to a locked state;
wherein when the second handle is operated to rotate along a first direction, the cylindrical element is driven to rotate with the second handle, and the movable element is driven to move from the locked end to the unlocked end to drive the transmission element to rotate, such that the lock is switched from the locked state to the unlocked state.

2. The lock of claim 1, wherein when the second handle is operated to rotate along a second direction, the cylindrical element is driven to rotate, and the movable element is driven to rotate with the cylindrical element along the second direction to drive the transmission element to rotate, such that the lock is switched from the locked state to the unlocked state.

3. The lock of claim 1, wherein the first handle set further comprises:

a lock element disposed in the first handle, an end of the lock element being disposed with an accommodating groove, the accommodating groove comprising a first abutting surface and a second abutting surface;
wherein the first end of the transmission element is disposed in the accommodating groove, and two sides of the first end respectively abut against the first abutting surface and the second abutting surface.

4. The lock of claim 1, wherein the movable element comprises:

a limiting hole inserted with the second end of the transmission element; and
a guiding part movably disposed in the guiding track.

5. The lock of claim 1, wherein the second handle comprises a penetrating hole, the cylindrical element further comprises a button, the button is exposed to outside through the penetrating hole of the second handle.

6. The lock of claim 1, wherein:

the first handle set further comprises a moving component, the moving component comprises:
a first engaging groove formed on a side of the moving component and comprising a first bottom; and
a second engaging groove formed on the side of the moving component and comprising a second bottom, wherein an included angle is between the first engaging groove and the second engaging groove, and a distance is between the first bottom and the second bottom along the rotating axis;
the transmission element comprises an abutting portion for abutting against the moving component;
when the lock is in the unlocked state, the abutting portion is located in the first engaging groove, when the lock is in the locked state, the abutting portion is located in the second engaging groove.

7. The lock of claim 6, wherein:

the first handle set further comprises a first cover plate, the first cover plate is fixedly disposed on the side of the door, the first cover plate comprises a first fitting portion;
the moving component further comprises a second fitting portion corresponding to the first fitting portion;
when the lock is in the unlocked state, the second fitting portion is separated from the first fitting portion, when the lock is in the locked state, the second fitting portion is fitted into the first fitting portion.

8. The lock of claim 7, wherein the first fitting portion is concaved from a surface of the first cover plate, the moving component further comprises a main body, and the second fitting portion is extended outwardly from the main body along a direction perpendicular to the rotating axis.

9. The lock of claim 7, wherein the first handle is connected to the first cover plate in a manner that the first handle is capable of rotating relative to the first cover plate, when the abutting portion is located in the first engaging groove, the first handle is capable of rotating relative to the first cover plate, when the abutting portion is in the second engaging groove, the first handle is incapable of rotating relative to the first cover plate.

10. The lock of claim 7, wherein the first handle set further comprises:

a first elastic element disposed in the first cover plate and abutting against another side of the moving component.

11. The lock of claim 10, wherein:

when the transmission element is driven to rotate and the abutting portion is moved from the first engaging groove to the second engaging groove, the abutting portion pushes the moving component to move along the rotating axis and towards the first elastic element, such that the second fitting portion is fitted into the first fitting portion;
when the transmission element is driven to rotate and the abutting portion is moved from the second engaging groove to the first engaging groove, the moving component is pushed by the first elastic element to move along the rotating axis and away from the first elastic element, such that the second fitting portion is separated from the first fitting portion.

12. The lock of claim 6, wherein the included angle is 90 degrees.

13. The lock of claim 6, wherein the moving component further comprises:

a guiding surface disposed on a side of the first engaging groove and located between the first engaging groove and the second engaging groove.

14. The lock of claim 13, wherein the moving component further comprises:

a stop surface opposite to the guiding surface and disposed on another side of the first engaging groove.

15. The lock of claim 1, wherein the second handle set further comprises:

a second elastic element disposed in the cylindrical element and abutting against the movable element.

16. The lock of claim 1, wherein the latch mechanism further comprises a first transfer shaft and a second transfer shaft, the first tubular element is connected to the first transfer shaft in a manner that the first tubular element and the first transfer shaft are capable of moving synchronously, the second tubular element is connected to the second transfer shaft in a manner that the second tubular element and the second transfer shaft are capable of moving synchronously, and the first transfer shaft is independent from the second transfer shaft.

17. A lock defining a rotating axis and for being installed on a door, the lock comprising:

a first handle set disposed on a side of the door, the first handle set comprising:

a first handle;

a first tubular element connected to the first handle in a manner that the first tubular element and the first handle are capable of moving synchronously; and a moving component comprising a first engaging groove and a second engaging groove, the first engaging groove formed on a side of the moving component and comprising a first bottom, the second engaging groove formed on the side of the moving component and comprising a second bottom, wherein an included angle is between the first engaging groove and the second engaging groove, a distance is between the first bottom and the second bottom along the rotating axis, and the moving component is a one-piece component;

a second handle set disposed on another side of the door, the second handle set comprising:

a second handle; and a second tubular element connected to the second handle in a manner that the second tubular element and the second handle are capable of moving synchronously, the second tubular element being independent from the first tubular element;

a transmission element having a first end and a second end opposite to the first end, the first end being connected to the first handle set, the second end being connected to the second handle set, the transmission element comprising an abutting portion for abutting against the moving component, and the transmission element being a one-piece component; and a latch mechanism disposed between the first handle set and the second handle set, the latch mechanism comprising a latch tongue, the first tubular element being capable of driving the latch tongue, and the second tubular element being capable of driving the latch tongue;

wherein when the lock is in an unlocked state, the abutting portion is located in the first engaging groove, when the lock is in a locked state, the abutting portion is located in the second engaging groove.

* * * * *